United States Patent [19]

Clements et al.

[11] 4,364,758
[45] Dec. 21, 1982

[54] SELF TENSIONING CAP FOR BAG FILTERS

[75] Inventors: Jack T. Clements; Robert E. Mace, both of Raytown, Mo.

[73] Assignee: Standard Havens, Inc., Kansas City, Mo.

[21] Appl. No.: 291,624

[22] Filed: Aug. 10, 1981

[51] Int. Cl.³ .............................................. B01D 46/02
[52] U.S. Cl. ........................................ 55/365; 55/379
[58] Field of Search ................ 55/365, 378, 379, 507; 210/323.2

[56] References Cited

U.S. PATENT DOCUMENTS

| | | | |
|---|---|---|---|
| 2,014,298 | 9/1935 | Schneible | 55/378 |
| 2,959,247 | 11/1960 | Sare et al. | 55/379 |
| 2,981,368 | 4/1961 | Johnson | 55/379 |
| 3,277,634 | 10/1966 | Wheaton | 55/379 |
| 3,406,502 | 10/1968 | Wilk | 55/378 |
| 3,881,673 | 5/1975 | Peterson | 55/378 |
| 4,113,455 | 9/1978 | Richmond | 55/378 |
| 4,157,900 | 6/1979 | Margraf | 55/379 |
| 4,303,424 | 12/1981 | Wheeler | 55/365 |

FOREIGN PATENT DOCUMENTS 1536144 12/1978 United Kingdom .................. 55/378

Primary Examiner—David L. Lacey
Attorney, Agent, or Firm—Kokjer, Kircher, Bradley, Wharton, Bowman & Johnson

[57] ABSTRACT

For an inside to outside dust collector, a self tensioning bag retainer for connecting the upper end of a fabric sleeve filter to an overhead support. For preinstallation of the filter assembly, a compressed tensioning spring is retained from movement by a pin member to facilitate ease of installation. With the pin member removed, however, the spring acts upwardly against a retainer cap to appropriately tension the sleeve filter and to permit controlled flexure during cycling from a filtering to a cleaning operation.

5 Claims, 3 Drawing Figures

SELF TENSIONING CAP FOR BAG FILTERS

BACKGROUND AND SUMMARY OF THE INVENTION

This invention relates to industrial baghouses and, more particularly, to a self tensioning cap for mounting cylindrical bag filters.

Continuous emphasis on environmental quality has resulted in increasing strenuous regulatory controls on industrial emissions. One technique which has proven highly efficient in controlling air pollution has been the separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within openings in the tube sheet are fabric filters. A particle-laden gas stream induced by the action of a fan, blows into one chamber, (dirty air plenum) wherein dust accumulates on the fabric filter as the gas passes through the fabric into the other plenum (clean air plenum) and out an exhaust.

Although all baghouses are designed in accordance with the foregoing general principles, there are numerous operational and structural distinctions. The present invention relates to a baghouse wherein a plurality of cylindrical filter bags having closed upper ends are vertically suspended in the clean air plenum from a bag support framework. The lower ends of the bags are fixed to openings in a tube sheet or cell plate. Filtration of the process gas occurs from inside to outside of the bags. As a result, baghouses constructed in this manner are normally referred to as inside to outside bag collectors.

During continuous operation of the baghouse the bags must be periodically cleaned to remove the filter cake which accumulates within the cylindrical sleeve. This may be done by interrupting the flow of the process gas carrying particulate matter and then causing reverse cleaning air to flow from the clean air plenum to the dirty air plenum. The reverse flow of cleaning air causes the dust cake to be dislodged and fall through the interior of the bag to the dirty air plenum for removal by an auger or similar means. In some baghouse installations, reverse air cleaning may also be supplemented with mechanical shaking of the filters.

The air cleaning process reverses the pressure drop the fabric filter normally experiences during filtering operation. In other words, the filter sleeve tends to collapse inwardly when being cleaned. This tendency is limited somewhat by circular support rings sewn to the outside of the bag at spaced intervals along its length.

Proper tensioning of the bags plays an important role in limiting fabric collapse during the cleaning process. If the bags are stretched too tightly between the supporting framework and the cell plate, the bags do not collapse during cleaning, but they tend to wear out quickly. If, on the other hand, the bags are installed too loosely then the fabric between adjacent skeletal support rings collapses during cleaning and will not permit the dust cake to fall through the bag to the bottom of the dirty air plenum.

Even when a bag filter is properly installed and tensioned correctly, it is reasonable to expect the fabric to stretch with age and with repeated cyclings between filtering and cleaning. Thus, the bags must be periodically checked and the tension readjusted for each bag from time to time.

The installation and maintenance of filter bags of this genre has traditionally been a time consuming and costly operation. Accordingly, there is a long felt need in this industry for improvements in filter bag assemblies and mounting techniques to alleviate the many installation and maintenance difficulties which have been encountered in the past. The primary goal of this invention is to meet this need.

More specifically, an object of this invention is to provide a self tensioning bag retainer to decrease installation and maintenance time and cost heretofore associated with baghouse operations. Also, the improved assembly achieves the added advantage of prolonging bag life which, in turn, results in a less rigorous maintenance schedule.

Another object of the invention is to provide a self tensioning bag retainer which permits controlled flexure of the bag during the cleaning cycle.

An additional object of the invention is to provide a self tensioning bag retainer for quick and easy installation by semi skilled personnel. Installation and proper tensioning can be accomplished with the aid of a pair of pliers. Calibration equipment and other specialty tools are thus eliminated.

A further object of the invention is to provide a bag retainer assembly which may be easily and quickly removed whenever replacement of the filter becomes necessary.

Yet another object of the invention is to provide a self tensioning bag retainer which accommodates the anticipated stretching of the bag filter over time and which adjustably maintains appropriate tension on the filter.

Other and further objects of the invention, together with the features of novelty appurtenant thereto, will appear in the course of the following description of the drawing.

DESCRIPTION OF THE DRAWING

In the accompanying drawing, which forms a part of the specification and is to be read in conjunction therewith, and in which like reference numerals are employed to indicate like parts in the various views.

DETAILED DESCRIPTION OF THE DRAWING

Figure 1:
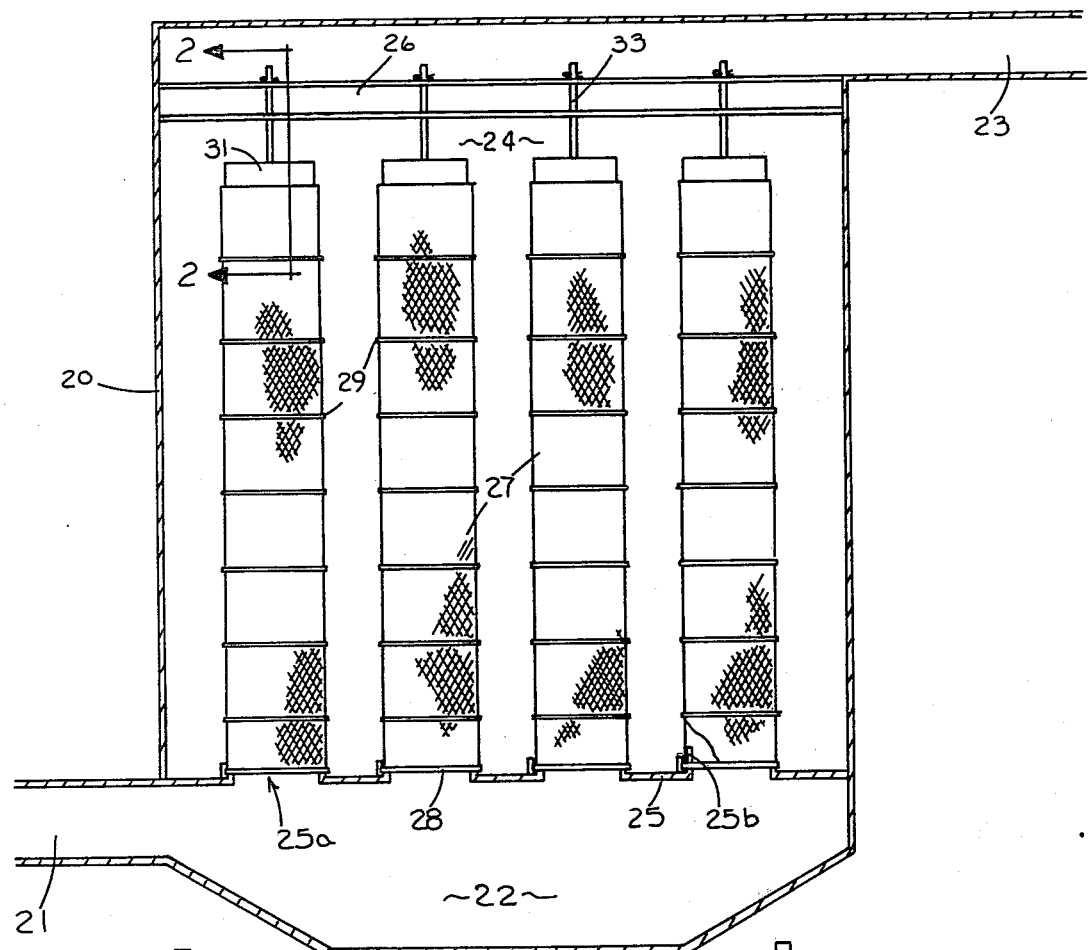
FIG. 1 is a side elevational view through an inside to outside bag collector illustrative of the type for which the self tensioning bag retainer of this invention is designed.

Referring to FIG. 1 in more detail, the baghouse basically comprises a sheet metal housing 20 equipped with an inlet duct 21 to the dirty air plenum 22 and an outlet duct 23 from the clean air plenum 24. Process gas is pulled through the baghouse by means of a fan (not shown).

Interiorly of the housing 20, the dirty and clean air plenums 22 and 24 are separated by a horizontal cell plate 25. A plurality of holes 25a penetrate the cell plate 25 and are integrally fitted with short cylindrical flanges 25b extending upwardly (see broken away portion of right most filter in FIG. 1).

Figure 2:
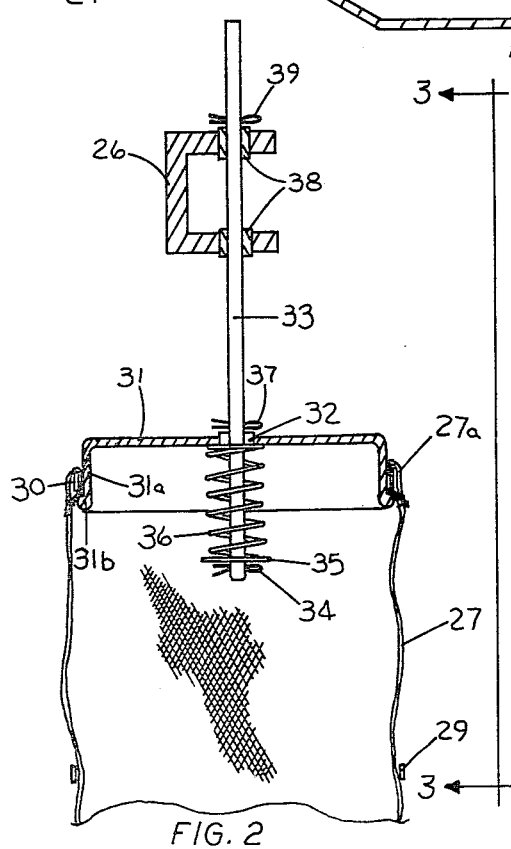
FIG. 2 is an enlarged sectional view of the self tensioning bag retainer, taken generally along line 2—2 of FIG. 1 in the direction of the arrows, showing the assembly at a stage when the installation is only partially completed.

In the upper region of the clean air plenum 24 is mounted a bag support framework 26 which, as shown in FIG. 2, is constructed of C-shaped channel members. The bag support framework can similarly be constructed of angle iron or flat iron and may be equipped with mechanical shaking apparatus as is known to be conventional in this art.

Mounted within the clean air plenum 24 are a plurality of filter assemblies. The assemblies include cylindrical fabric sleeve filters 27. The lower end of each sleeve filter 27 is fitted over the cylindrical flange 25b of the cell plate 25 and secured thereto by a clamping band 28. At spaced intervals along the length of the filter sleeves 27 are sewn skeletal support rings 29 to prevent collapse of the bag during reverse air cleaning. At the upper end of the filter sleeve 27, the fabric is lapped on itself and stitched to form a cuff 27a. A continuous rigid band 30 is disposed within the cuff 27a. The support rings 29 may be covered with cloth or disposed in a cuff to facilitate manufacture or to prevent abrasion.

The upper end of the filter sleeve 27 is supported by an inverted circular retainer cup 31 having a cylindrical side wall 31a which terminates in a peripheral ridge 31b. The rigid band 30 within the cuff 27a of the filter sleeve 27 is slightly larger in diameter than the cylindrical side wall 31a of the retainer cup 31, but slightly less in diameter than the peripheral ridge 31b. The skeletal support rings 29, however, are larger in diameter than the peripheral ridge 31b. Thus, the retainer cup 31 may be slipped upwardly through the fabric sleeve 27 passing between the support rings 29 to the upper end of the fabric sleeve 27. At the upper end of the sleeve, the cuff 27a and rigid band 30 are pressingly fit onto the cylindrical side wall 31a of the retainer cup 31 to sealingly close the upper end of the filter sleeve 27.

The center of the retainer cup 31 is equipped with a bushing 32 which receives an elongate rod 33. The lower end of the rod 33 is laterally bored to receive a pin or key 34 above which is carried a washer 35 and then a compression spring 36 which acts against the lower surface of the retainer cup 31. Bored laterally through the lower length of the rod 33 is a spring capture hole 33a (FIG. 3) which, as shown in FIG. 2, receives a removable pin or key 37 to engage the upper surface of retainer cup 31 and thereby capture in a compressed condition the spring 36 between pins 34 and 37.

The upper length of the rod 33 has a plurality of lateral holes 33b spaced along the rod 33. This upper length of the rod 33 is received by a pair of bushings 38 on the horizontal bites of the C-shaped support channel 26. A removable pin or key 39 is fitted in one of the holes 33b in order to support the entire filter assembly from atop the upper surface of the support channel 26.

A large number of different connections between the rod 33 and the support framework are naturally possible. For example, the bushings 38 shown in the drawings may be eliminated and simply a hole provided in the support framework to receive the rod 33.

Figure 3:
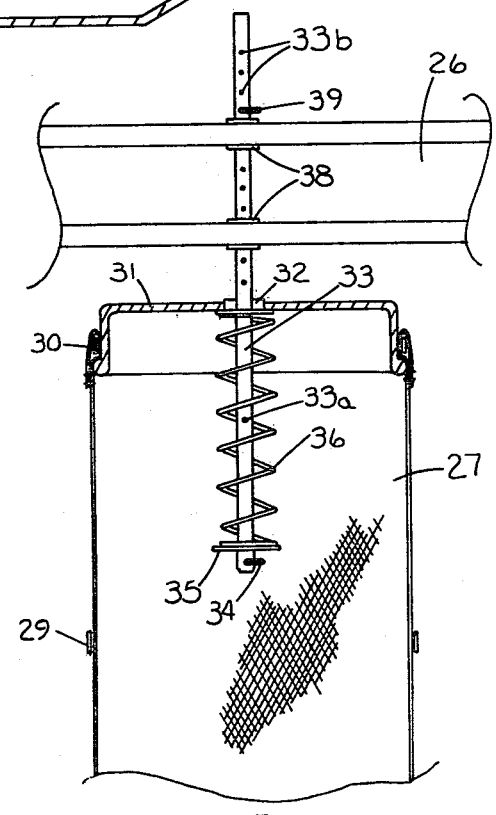
FIG. 3 is a side sectional view of the bag retainer, taken generally along line 3—3 of FIG. 2 in the direction of the arrows, showing the assembly fully installed with the retainer applying appropriate tension to the bag filters.

For installation of a filter assembly in baghouse 20, the self tensioning retainer cap is first disposed within the upper end of the filter sleeve 27 as previously indicated. At such stage of installation, spring 36 is substantially compressed and captured between pins 34 and 37. A workman fits the lower end of the sleeve 27 around the flange 25b of the cell plate 25 and secures the filter thereto by installing the clamping band 28. With pin 39 removed, rod 33 is inserted through the bushings 38 of the support frame 26. Rod 33 is moved upwardly to pull the filter 27 as taut as possible by only ordinary force of the workman and the pin 39 is inserted in the closest hole 33b adjacent the upper surface of the support frame 26. At this stage of the installation, the assembly is depicted in FIG. 2 of the drawing and it is to be noted that the filter sleeve 27 is not properly tensioned but is likely to have a slight degree of slack. Next, pin 37 is removed from the spring capture hole 33a by the workman using a pair of pliers. Removal of the pin 37 releases the spring 36 to act upwardly against the lower surface of the retainer cap 31, as shown in FIG. 3, to properly tension the filter sleeve 27.

Tensioning of the filter sleeve 27 is thus determined by the spring 36 which will accommodate stretch or aging of the fabric. Furthermore, during reverse air cleaning, spring 36 will permit controlled flexure of the bag by slight compression of spring 36 in order to alleviate stress on the fabric caused by reversing the pressure drop across the filter.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. In an inside to outside dust collector having a bag support frame and a cell plate to which is connected one end of a fabric sleeve filter, a self tensioning bag retainer comprising:

a circular bag support member which is sealingly connected to the other end of said fabric sleeve filter to support said filter, said bag support member having first and second sides;

an elongate shaft centrally penetrating said bag support member and having first and second ends extending respectively from said first and second sides of said bag support member, said elongate shaft having a lateral opening intermediate the ends thereof;

compressible tensioning means disposed between said first end of the elongate shaft and said first side of the bag support member to urge said bag support member toward said second end of the elongate shaft;

removable compression holding means comprising a pin member removably disposed through said lateral opening of said elongate shaft to engage said second side of the bag support member to compress said compressible tensioning means and to limit travel of said bag support member toward said second end of the elongate shaft; and adjustable support means connecting said second end of the elongate shaft to said bag support frame.

2. In an inside to outside dust collector having a bag support frame and a cell plate to which is connected one end of a fabric sleeve filter, a self tensioning bag retainer comprising:

- a circular bag support member which is sealingly connected to the other end of said fabric sleeve filter to support said filter, said bag support member having first and second sides;
- an elongate shaft centrally penetrating said bag support member and having first and second ends extending respectively from said first and second sides of said bag support member, said shaft having a plurality of spaced holes bored laterally therethrough adjacent said second end thereof;
- compressible tensioning means disposed between said first end of the elongate shaft and said first side of the bag support member to urge said bag support member toward said second end of the elongate shaft; and
- adjustable support means connecting said second end of the elongate shaft to said bag support frame, said support means comprising a pin removably disposed through one of said spaced holes of said elongate shaft to engage said bag support frame for support thereon.

3. The dust collector as in claim 1 or 2, said circular bag support member comprising a circular cup having a cylindrical sealing surface and a peripheral ridge projecting outwardly from said sealing surface; said fabric sleeve filter includes a cuff formed in said other end thereof and a continuous band disposed within said cuff to encircle said sealing surface of said circular cup and thereby seal said filter against said cup.

4. The dust collector as in claim 3, said continuous band being larger in diameter than said sealing surface but smaller in diameter than said peripheral ridge.

5. The dust collector as in claim 1 or 2, said circular bag support member including a bushing encircling said elongate shaft to facilitate movement of said bag support member along said shaft.

* * * * *